(12) United States Patent
Zhang et al.

(10) Patent No.: US 12,525,817 B2
(45) Date of Patent: Jan. 13, 2026

(54) STANDBY POWER SUPPLY AND METHOD FOR OPERATING SAME

(71) Applicant: Envision Energy Technology Pte Ltd., Singapore (SG)

(72) Inventors: Xinyu Zhang, Jiangsu (CN); Jin Wen, Jiangsu (CN); Qihui Xu, Jiangsu (CN); Zichen Hu, Jiangsu (CN); Wei Gu, Jiangsu (CN)

(73) Assignee: Envision Energy Technology Pte Ltd., Singapore (SG)

( * ) Notice: Subject to any disclaimer, the term of this patent is extended or adjusted under 35 U.S.C. 154(b) by 0 days.

(21) Appl. No.: 18/577,701

(22) PCT Filed: Aug. 17, 2021

(86) PCT No.: PCT/CN2021/112916
§ 371 (c)(1),
(2) Date: Jan. 9, 2024

(87) PCT Pub. No.: WO2023/019418
PCT Pub. Date: Feb. 23, 2023

(65) Prior Publication Data
US 2024/0332968 A1 Oct. 3, 2024

(51) Int. Cl.
*H02J 9/06* (2006.01)
*H02J 3/32* (2006.01)

(52) U.S. Cl.
CPC ............... *H02J 9/062* (2013.01); *H02J 3/32* (2013.01); *H02J 2300/28* (2020.01); *Y02E 10/76* (2013.01)

(58) Field of Classification Search
CPC ............... H02J 9/04–08; H02J 3/28–32; H02J 3/38–50; Y02E 10/70–76
See application file for complete search history.

(56) References Cited

U.S. PATENT DOCUMENTS

| 2004/0066094 A1* | 4/2004 | Suzuki | H02J 3/38 307/18 |
|---|---|---|---|
| 2004/0155527 A1 | 8/2004 | Bryde | |

(Continued)

FOREIGN PATENT DOCUMENTS

| CN | 102593832 | 7/2012 |
|---|---|---|
| CN | 104393666 | 3/2015 |

(Continued)

OTHER PUBLICATIONS

"International Search Report (Form PCT/ISA/210) of PCT/CN2021/112916," mailed on Mar. 29, 2022, with English translation thereof, pp. 1-4.

(Continued)

*Primary Examiner* — Rexford N Barnie
*Assistant Examiner* — David A Shiao
(74) *Attorney, Agent, or Firm* — USCH Law, PC

(57) ABSTRACT

The present disclosure relates to a standby power supply, including: a first sub power supply configured to provide alternating current electrical energy, where the first sub power supply is connected to an input terminal of an alternating current/direct current (AC/DC) converter; the AC/DC converter configured to convert the alternating current electrical energy into direct current electrical energy, where an output terminal of the AC/DC converter is connected to an output terminal of the standby power supply; and second sub power supplies configured to provide the direct current electrical energy, where the second sub power supplies are connected to the output terminal of the standby power supply. Through the present disclosure, a standby power supply solution having high reliability and capable of meeting power consuming requirements of a load with a great change in power demand such as a wind generator may be provided.

13 Claims, 3 Drawing Sheets

(56) References Cited

U.S. PATENT DOCUMENTS

| | | | | |
|---|---|---|---|---|
| 2005/0127880 A1* | 6/2005 | Colley | | H02J 3/322 322/7 |
| 2009/0021079 A1* | 1/2009 | Johnson, Jr. | | H02J 9/062 307/68 |
| 2009/0230689 A1* | 9/2009 | Burra | | H02J 9/062 290/55 |
| 2012/0245744 A1* | 9/2012 | Prosser | | H02J 3/32 700/286 |
| 2013/0041514 A1* | 2/2013 | Apalenek | | H02J 9/062 713/300 |
| 2014/0175886 A1 | 6/2014 | Kwok et al. | | |
| 2015/0153394 A1* | 6/2015 | Carlson | | G05B 15/02 700/291 |
| 2015/0303690 A1* | 10/2015 | Miyazaki | | G05B 15/02 700/291 |
| 2016/0359328 A1* | 12/2016 | Hunt | | H02J 7/1423 |
| 2018/0159330 A1* | 6/2018 | Kang | | H02J 3/38 |
| 2018/0269685 A1* | 9/2018 | Sugeno | | H02S 40/32 |
| 2020/0366101 A1 | 11/2020 | Lim et al. | | |
| 2020/0371574 A1* | 11/2020 | Ramamurthy | | G06F 1/28 |
| 2022/0224146 A1* | 7/2022 | Søgaard | | F03D 7/0284 |
| 2022/0247206 A1* | 8/2022 | Fukano | | H02J 9/061 |
| 2023/0006465 A1* | 1/2023 | Hu | | H02J 9/062 |

FOREIGN PATENT DOCUMENTS

| | | |
|---|---|---|
| CN | 105226804 A | 1/2016 |
| CN | 206685965 | 11/2017 |
| CN | 109066964 | 12/2018 |
| CN | 112821547 | 5/2021 |

OTHER PUBLICATIONS

Envision Energy Technology Pte Ltd., European Search Report, EP21953671.1, May 19, 2025, 8 pgs.

* cited by examiner

STANDBY POWER SUPPLY AND METHOD FOR OPERATING SAME

CROSS-REFERENCE TO RELATED APPLICATION

This application is a 371 of international application of PCT application serial no. PCT/CN2021/112916, filed on Aug. 17, 2021. The entirety of each of the above-mentioned patent applications is hereby incorporated by reference herein and made a part of this specification.

TECHNICAL FIELD

In general, the present disclosure relates to the field of wind generators, and more specifically to a standby power supply and a method for operating the same. In addition, the present disclosure further relates to a wind generator having such standby power supply.

RELATED ART

In recent years, as countries pay more attention to the environment, the field of clean energy has shown a trend of rapid development. As a new type of energy, clean energy has the advantages of wide distribution, being renewable, and less environmental pollution compared with conventional fossil fuels. As a representative of clean energy, the application of wind generators is growing. In addition, due to restrictions on movement of people due to force majeure such as the COVID-19 pandemic in recent years, the advantages of power generation devices capable of operating for a long term without human operation such as wind generators have become increasingly prominent.

A wind power generator (or a wind generator for short) has many important parts that need to be powered, such as a pitch bearing, a yaw bearing, and a control circuit. Stable power supply of these important parts directly determines normal operation and operation safety of the wind generator. Generally, these parts are powered by an alternating current power grid. However, in the event of a failure of the alternating current power grid, these parts must be powered by a standby power supply. At present, it is difficult for the standby power supply to adapt to great power changes of electrical loads. Therefore, a standby power supply having high reliability and capable of meeting power consuming requirements of a load with a great change in power such as a wind generator under an extreme condition, especially during power failure of a power grid is needed.

SUMMARY OF INVENTION

Starting from the prior art, a task of the present disclosure is to provide a standby power supply integrating a plurality of power supplies and a method for operating the same. Through the standby power supply and/or the operating method, a standby power supply solution having high reliability and capable of meeting power consuming requirements of a load with a great fluctuation in power demand such as a wind generator under an extreme condition, especially during power failure of a power grid may be provided. In other words, the present disclosure may be applicable to not only sudden power change during normal power supply of the power grid, but also sudden power change under the extreme condition, especially sudden power change during power failure of the power grid.

In a first aspect of the present disclosure, the task is solved by a standby power supply, and the standby power supply includes:

a first sub power supply configured to provide alternating current electrical energy, where the first sub power supply is connected to an input terminal of an alternating current/direct current (AC/DC) converter;

the AC/DC converter configured to convert the alternating current electrical energy into direct current electrical energy, where an output terminal of the AC/DC converter is connected to an output terminal of the standby power supply; and second sub power supplies configured to provide the direct current electrical energy, where the second sub power supplies are connected to the output terminal of the standby power supply.

Within the scope of the present disclosure, the term "alternating current electrical energy" includes an alternating current, an alternating current voltage, and alternating current power, and the term "direct current electrical energy" includes a direct current, a direct current voltage, and direct current power. The term "AC/DC converter" includes various devices for converting the alternating current electrical energy into the direct current electrical energy, such as a diode, a half wave rectifier, a full wave rectifier, a thyristor, and a fully controlled bridge. The term "sub power supply" refers to various electrical devices capable of providing the alternating current or direct current electrical energy, such as a battery and a generator, where the sub power supply particularly refers to a power supply other than the power grid, i.e., a power supply which may be put into use under the extreme condition, especially during the power failure of the power grid. In the present disclosure, the generator may include various types of generators, especially fuel generators, such as a diesel generator, a hydrogen generator, an ethanol generator, and a fossil fuel generator.

In an extended solution of the present disclosure, the standby power supply further includes a first switch, wherein the first sub power supply is connected to the input terminal of the AC/DC converter via the first switch.

In another extended solution of the present disclosure, the standby power supply further includes DC/DC converters configured to convert the direct current electrical energy into direct current electrical energy with different parameters, where the DC/DC converters are connected between the second sub power supplies and the output terminal of the standby power supply, and output terminals of the DC/DC converters are connected to the output terminal of the standby power supply via second switches.

The DC/DC converters are not necessary. For example, when output electrical energy of the second sub power supplies may supply power to the load without conversion, the DC/DC converters are not required. On the contrary, when the output electrical energy of the second sub power supplies cannot directly supply power to the load and needs to be subjected to conversion (such as current and voltage conversion), the DC/DC converters are required.

In yet another extended solution of the present disclosure,
the first sub power supply includes one or more of the following:
a generator; and
a combination of a battery pack and a direct current to alternating current converter; and
each of the second sub power supplies includes one or more of the following:

a battery pack and a supercapacitor; and a combination of a generator and an alternating current to direct current converter.

In another extended solution of the present disclosure, the DC/DC converters are bidirectional DC/DC converters, and the standby power supply further includes a third switch, where an alternating current power grid is connected to the input terminal of the AC/DC converter via the third switch.

Herein, the term "bidirectional DC/DC converter" refers to that it is possible to input direct current electrical energy from an input terminal or an output terminal of the bidirectional DC/DC converter and output converted direct current electrical energy at the output terminal or the input terminal.

In another extended solution of the present disclosure, the first switch and/or each of the second switches and/or the third switch includes one of the following: a power switch, a circuit breaker, a contactor, and a relay.

In yet another extended solution of the present disclosure, the standby power supply further includes inverters configured to convert the direct current electrical energy into the alternating current electrical energy, where each of the inverters has input terminals connected to the output terminal of the standby power supply and an output terminal connected to a load.

In a preferred solution of the present disclosure, the standby power supply further includes a controller configured to:

when it is detected that a voltage of the alternating current power grid connected via the third switch is lower than a voltage threshold, close the first switch and/or the second switches to connect the first sub power supply and/or the second sub power supplies, such that in the case of closing the second switches, the DC/DC converters operate forwards to discharge the second sub power supplies, where:

when expected output power of the standby power supply is less than or equal to a power threshold, close the first switch and open the second switches to connect the first sub power supply; and when the expected output power of the standby power supply is greater than the power threshold, close the first switch and the second switches to connect the first sub power supply and the second sub power supplies.

With the preferred solution, the requirements of average power and peak power of the load may be met. This is based on the following insight of the inventor: through research, the inventor has found that an alternating current standby power supply such as a diesel generator has high energy density, making it suitable for providing the average power to the load; and a direct current standby power supply such as a fuel cell has high response speed, parallel capacity expansion, and high power density, making it suitable for providing the peak power to the load. Therefore, when the power requirement of the load is low, i.e., the power of the load does not exceed the power threshold, the alternating current standby power supply may be used to provide the electrical energy for the load to provide the average power, and when the power requirement of the load is high, i.e., the power of the load exceeds the power threshold, the direct current standby power supply may be used to provide the electrical energy for the load to provide the peak power. The power threshold may be determined in a specific calculation way to better meet the power demand of the load. It should be pointed out that the present disclosure is applicable to not only the field of wind generators, but also other fields with electrical loads, such as the field of photovoltaics (for example, the standby power supply according to the present disclosure is used to supply power to a component such as a photovoltaic control circuit), the field of meteorological devices, and lighting facilities.

In another preferred solution of the present disclosure, the controller is further configured to:

when it is detected that the voltage of the alternating current power grid connected via the third switch is higher than the voltage threshold and an electric quantity of the second sub power supplies is lower than an electric quantity threshold, close the second switches, such that the DC/DC converters operate reversely to charge the second sub power supplies from the alternating current power grid.

With the preferred solution, the second standby power supplies may be charged when not in use, making them usable at any time.

In a second aspect of the present disclosure, the foregoing task is solved by a method for operating the standby power supply according to the present disclosure, and the method includes the following steps:

determining a power grid voltage of an alternating current power grid connected via a third switch;

when the power grid voltage is lower than a voltage threshold and expected output power of the standby power supply is less than or equal to a power threshold, closing a first switch and opening second switches to connect a first sub power supply for supplying power;

when the power grid voltage is lower than the voltage threshold and the expected output power of the standby power supply is greater than the power threshold, closing the first switch and the second switches to connect the first sub power supply and the second sub power supplies for supplying power together, such that DC/DC converters operate forwards to discharge the second sub power supplies; and when the power grid voltage is higher than the voltage threshold and an electric quantity of the second sub power supplies is lower than an electric quantity threshold, closing the second switches, such that the DC/DC converters operate reversely to charge the second sub power supplies from the alternating current power grid.

In a preferred solution of the present disclosure, the method further includes the following steps:

determining the power threshold $P_{threshold}$ according to the following formula:

$P_{threshold}=P_{average}*a+P_{peak}*(1-a)$, where $0 \leq a \leq 1$; $P_{average}$ is average power required for a power supply load, which may be subjected to statistics based on minute level load data; $P_{peak}$ is peak power of the power supply load, which may be subjected to statistics based on second level load data; and a is a proportional coefficient, by which the power threshold may be adjusted according to an actual system operation condition.

For example, in an auxiliary power supply system of the wind generator, $P_{average}$ is 34 kW, $P_{peak}$ is 73 kW, a is 0.6, and $P_{threshold}$ may be set to 57 kW. Through research, the inventor has found that a time point at which a transition from the average power to the peak power occurs may be adjusted by adjusting a, that is, when the load power reaches a specific point between the average power and the peak power, the power of the standby power supply is adjusted to the peak power or above. The smaller the a is, the earlier the time point is, otherwise the later it is. Research has proved that when a ranges from 0.6 to 0.8, a better power transition may be implemented. In a preferred embodiment, a ratio between the power of the generator (such as the diesel generator) and the average power of the load of the power supply is greater than or equal to 1:1, and a ratio between the power of the generator and the peak power of the load of the power supply is less than or equal to 1:2 (i.e., less than or equal to 0.5). In this case, the power of the generator (the first sub power supply) is less than or equal to the power of the battery packs (the second sub power supplies). In view of this, a low-power generator may be configured instead of a high-power generator, thereby reducing the cost of the standby power supply.

In addition, the present invention further relates to a wind generator having the standby power supply according to the present disclosure, where a load connected to an output terminal of the standby power supply includes one or more of the following: a yaw bearing, a pitch bearing, and a control circuit. Other loads may also be conceivable. For example, in the case of a photovoltaic device, the load may be a photovoltaic control circuit or an active device in the photovoltaic device.

The present disclosure has at least the following beneficial effects: through research, the inventor has found that in a power consuming scenario such as the wind generator, the electrical loads such as the pitch bearing and the yaw bearing may have a jump or fluctuation in power based on the average power due to influence factors such as wind strength, that is, the peak power may frequently occur. Therefore, the standby power supply needs to balance the average power and the peak power of the load, and these suddenly changed power demands should also be met under the extreme condition, especially during the power failure of the power grid. Through further research, the inventor has found that the alternating current standby power supply such as the diesel generator has high energy density, making it suitable for providing the average power to the load; and the direct current standby power supply such as the fuel cell and the supercapacitor has high response speed (immediate power supply after connection), parallel capacity expansion (unlimited parallel battery capacity expansion), and high power density, making it suitable for providing the peak power to the load. Therefore, the inventor has found that if the standby power supply has the alternating current standby power supply and the direct current standby power supply connected in parallel, the average power and the peak power of the electrical load may be better balanced, thus better meeting the power consuming requirements of the load. Moreover, the inventor further has found that switching from the alternating current power supply to the direct current power supply or switching of the alternating current power supply and the direct current power supply is implemented by reasonably setting the power threshold, so as to better and faster implement output power transient. In addition, the inventor reasonably sets a circuit structure to ensure that the second standby power supplies can be charged from the alternating current power grid when not in use, making them usable at any time. Furthermore, the inventor also has unexpectedly found that through the circuit arrangement of the present disclosure, the load is connected to the alternating current power grid through the converter (the AC/DC converter or the inverter). In this way, the load is isolated from a previous power grid transformer, such that the power consuming unit, i.e., the load is converted by the converter and then connected to a direct current bus, thereby improving the system efficiency of the standby power supply, and reducing operation and maintenance costs and hardware investment.

BRIEF DESCRIPTION OF DRAWINGS

The present disclosure is further described below with reference to the accompanying drawings and specific embodiments.

DESCRIPTION OF EMBODIMENTS

Figure 1:
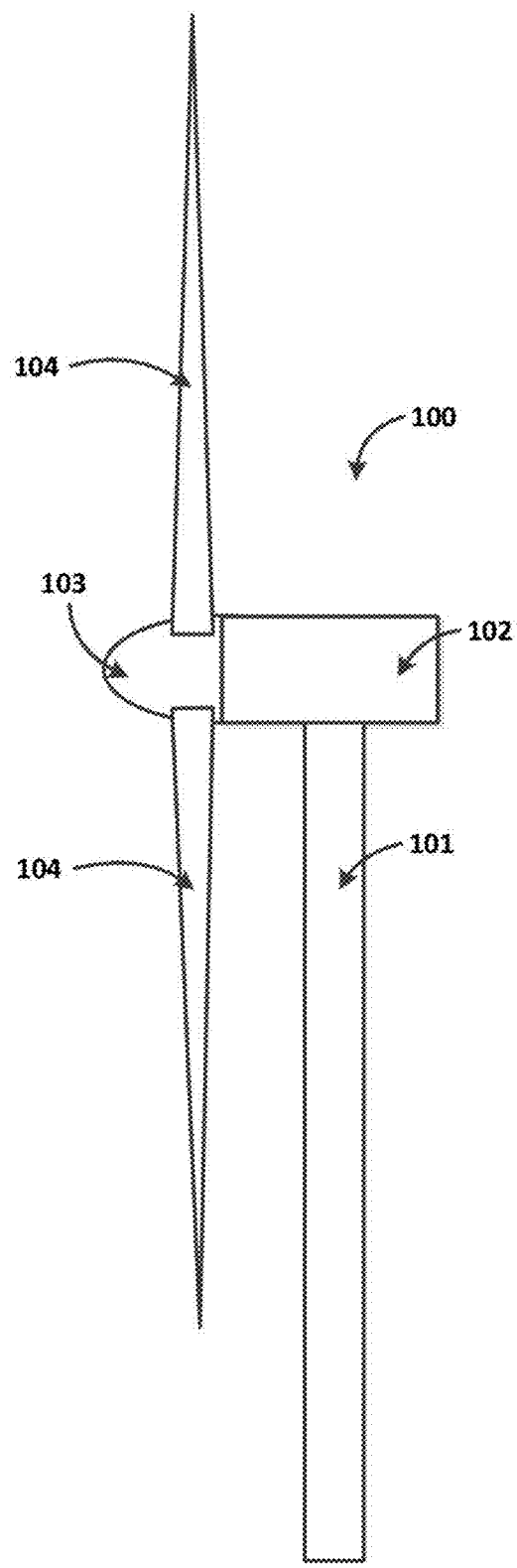
FIG. 1 shows a schematic diagram of a wind generator to which the present disclosure is applied.

It should be pointed out that the components in the accompanying drawings may be exaggeratedly shown for illustrative purposes and may not necessarily be proportionally correct. In the accompanying drawings, the same or functionally same components are denoted with the same reference numerals.

In the present invention, unless otherwise specified, the terms "arranged on . . . ", "arranged above . . . ", and "arranged over . . . " do not exclude the existence of an intermediate between the two. In addition, the term "arranged on or above . . . " only indicates a relative positional relationship between two components, and in a specific situation, for example, after the direction of a product is inverted, it may also be converted into the term "arranged under or below . . . ", and vice versa.

In the present disclosure, the embodiments are only intended to illustrate the solutions of the present disclosure and should not be understood as restrictive.

In the present disclosure, unless otherwise specified, the quantifiers "one" and "a/an" do not exclude a scenario where a plurality of elements exist.

In the present disclosure, the term "connection" may refer to a direct connection between the two or an indirect connection between the two via an intermediate element.

Herein, it should also be pointed out that in the embodiments of the present disclosure, for clarity and simplicity, only some parts or components may be shown, but those of ordinary skill in the art can understand that required parts or components may be added according to requirements of specific scenarios under the guidance of the present disclosure. In addition, unless otherwise specified, the features in different embodiments of the present disclosure may be combined with each other. For example, a feature in the second embodiment may be used to replace a corresponding or functionally same or similar feature in the first embodiment, and the obtained embodiment also falls within the scope of disclosure or description of the present application.

Herein, it should also be pointed out that within the scope of the present disclosure, the terms "same", "equal", "equal to", etc. do not mean that the values of the two are absolutely equal, but rather allow for a specific reasonable error, that is to say, the terms also cover "basically same", "basically equal", and "basically equal to". By analogy, in the present disclosure, the terms "perpendicular to", "parallel to", etc. which indicate the directions also cover the meanings of "basically perpendicular to" and "basically parallel to".

In addition, the numbers of the steps of each method according to the present disclosure do not limit an execution order of the method steps. Unless otherwise specified, the steps of each method may be executed in a different order.

In addition, it should also be pointed out that the present disclosure is applicable to not only the field of wind generators, but also other fields with electrical loads, such as the field of photovoltaics (for example, a standby power supply according to the present disclosure is used to supply power to a component such as a photovoltaic control circuit), the field of meteorological devices, and lighting facilities.

The principle on which the present disclosure is based is described first. Through long-term research in the field of wind generators, the inventor has found that in a power consuming scenario such as a wind generator, an electrical load such as a pitch bearing and a yaw bearing may has an instantaneous or short-time jump in power based on average power due to influence factors such as wind strength, adjusting speed, and mechanical resistance, that is, peak power may occur. Therefore, the standby power supply needs to balance the average power and the peak power of the load under an extreme condition, especially during power failure of a power grid, otherwise the situation that the load cannot operate normally and even breaks down may occur. Through further research, the inventor has found that an alternating current standby power supply such as a diesel generator has high energy density, making it suitable for providing the average power to the load; and a direct current standby power supply such as a fuel cell has high response speed (immediate power supply after connection), parallel capacity expansion (unlimited parallel battery capacity expansion), and high power density, making it suitable for providing the peak power to the load. Therefore, the inventor has found that if the standby power supply has the alternating current standby power supply and the direct current standby power supply connected in parallel, the average power and the peak power of the electrical load may be better balanced, thus better meeting power consuming requirements of the load. Moreover, the inventor further has found that switching from the alternating current power supply to the direct current power supply or switching of the alternating current power supply and the direct current power supply is implemented by reasonably setting a power threshold, so as to better and faster implement output power transient. In addition, the inventor reasonably sets a circuit structure to ensure that the second standby power supplies can be charged from the alternating current power grid when not in use, making them usable at any time. Furthermore, the inventor also has unexpectedly found that through the circuit arrangement of the present disclosure, the load is connected to the alternating current power grid through a converter (an AC/DC converter or an inverter). In this way, the load is isolated from a previous power grid transformer, such that the power consuming unit, i.e., the load is converted by the converter and then connected to a direct current bus, thereby improving the system efficiency of the standby power supply, and reducing operation and maintenance costs and hardware investment.

The present disclosure is further described below with reference to the accompanying drawings and specific embodiments.

FIG. 1 shows a schematic diagram of a wind generator 100 to which the present disclosure is applied. The wind generator 100 shown in FIG. 1 includes a tower 101 and a nacelle 102 rotatably connected to the tower 101 and supporting a hub 103. Two or more blades 104 are arranged on the hub 103, where the blades 104 drive a rotor (not shown) arranged in the hub 108 to rotate about an axis (not shown) under the action of wind, and the rotation of the rotor of the power generator relative to a stator will cause electrical energy to be generated. The wind generator 100 may include various power consuming loads, such as a pitch bearing, a yaw bearing, and a control circuit. Under normal circumstances, the loads of the wind generator 100 are powered by the alternating current power grid, but in the case of a fault or power outage in the alternating current power grid, the standby power supply is required to supply power to these loads, otherwise, these loads cannot operate.

Figure 2:
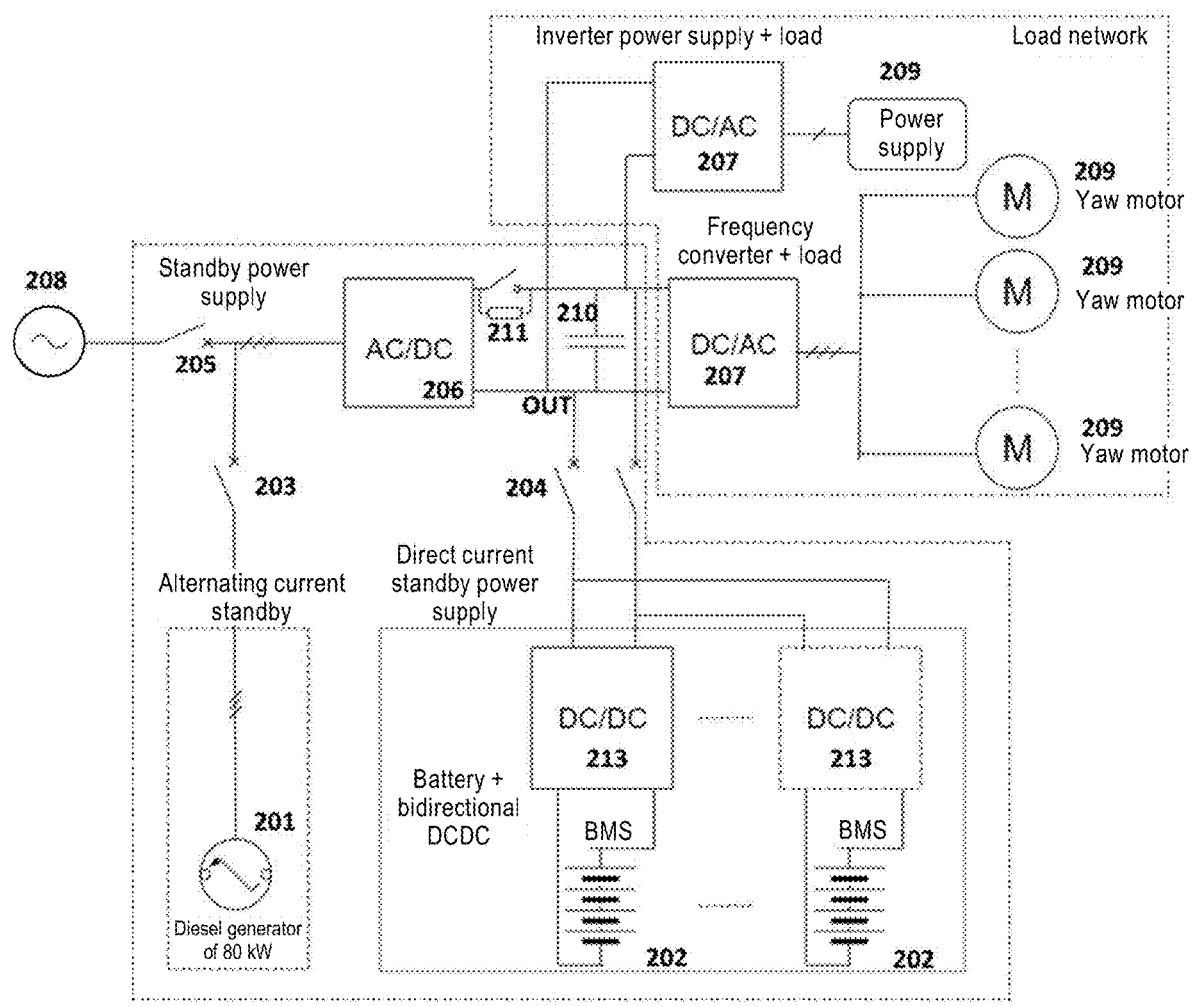
FIG. 2 shows a circuit diagram of a standby power supply integrating a plurality of power supplies according to the present disclosure.

FIG. 2 shows a circuit diagram of a standby power supply 200 integrating a plurality of power supplies according to the present disclosure.

As shown in FIG. 2, the standby power supply 200 according to the present disclosure includes the following components, some of which are optional.

A first sub power supply 201 is provided. The first sub power supply is configured to provide alternating current electrical energy, which includes, for example, an alternating current, an alternating current voltage, and alternating current power. The first sub power supply is connected to an input terminal of an AC/DC converter 206 via a first switch 203. The first switch 201 may be, for example, a power switch, a circuit breaker, a contactor, or a relay. In this embodiment, the first sub power supply 201 is preferably a diesel generator, such as a 80 kW diesel generator. A fuel generator can persistently provide average power due to its high energy density. In this embodiment, a single first sub power supply 201 is shown only. In other embodiments, a plurality of first sub power supplies 201 may be arranged and are connected in parallel.

An AC/DC converter 206 is provided. The AC/DC converter is configured to convert the alternating current electrical energy into direct current electrical energy, where an output terminal of the AC/DC converter is connected to an output terminal OUT of the standby power supply. In the present disclosure, the AC/DC converter may include various devices for converting the alternating current electrical energy into the direct current electrical energy, such as a diode, a half wave rectifier, a full wave rectifier, a thyristor, and a fully controlled bridge.

Second sub power supplies 202 are provided. The second sub power supplies are configured to provide the direct current electrical energy, which includes, for example, a direct current, a direct current voltage, and direct current power. The second sub power supplies 202 are connected to input terminals of DC/DC converters 213 or are directly connected to the output terminal OUT of the standby power supply 200 without the DC/DC converters 213. In this embodiment, two second sub power supplies 202 are shown. In other embodiments, one or more second sub power supplies 202 may be arranged and are connected in series to corresponding DC/DC converters 213 and then connected in parallel. In this embodiment, the second sub power supplies 202 are a plurality of batteries (such as fuel cells or other batteries) connected in series, which may provide multiple times of a battery voltage. In other embodiments, the second sub power supplies 202 may also be a plurality of batteries (such as fuel cells or other batteries) connected in parallel to provide multiple times of a battery current. The number of batteries connected in parallel or in series may be arbitrary, for example, it may be determined based on the average power and the peak power.

Optional DC/DC converters 213 are provided. The DC/DC converters are configured to convert the direct current electrical energy input from the second sub power supplies 202 into direct current electrical energy with different parameters, where output terminals of the DC/DC converters are connected to the output terminal of the standby power supply via second switches 204. The second switches 204 may be, for example, power switches, circuit breakers, contactors, or relays. For example, the DC/DC converters 213 convert the input direct current electrical energy into the direct current electrical energy with different currents or voltages, and magnitudes of the currents and the voltages may be determined based on required power or rated currents or rated voltages of the loads. In this embodiment, two DC/DC converters 213 are shown. In other embodiments, one or more DC/DC converters 213 may be arranged and are connected in series to corresponding second sub power supplies 202 and then connected in parallel. The DC/DC converters 213 are particularly bidirectional DC/DC converters, where the bidirectional DC/DC converter refers to that it is possible to input direct current electrical energy from an input terminal of the bidirectional DC/DC converter and output converted direct current electrical energy at an output terminal (during forward operation), or to input direct current electrical energy from an output terminal of the bidirectional DC/DC converter and output converted direct current electrical energy at an input terminal (during reverse operation).

An optional third switch 205 is provided, where an alternating current power grid 208 is connected to the input terminal of the AC/DC converter 206 via the third switch 205. The third switch 205 may be, for example, a power switch, a circuit breaker, a contactor, or a relay. Through corresponding control, the alternating current power grid 208 may supply power to the load and charge the first sub power supply and/or the second sub power supplies.

Optional inverters 207 are provided. The inverters are configured to convert the direct current electrical energy into the alternating current electrical energy. Each inverter 207 has input terminals connected to the output terminal OUT of the standby power supply and an output terminal connected to the load. Herein, a capacitor 210 may be connected between the two input terminals of each inverter 207. The capacitor 210 may suppress high-frequency clutters/harmonics in the electrical energy input from the power grid or the sub power supply, and may also absorb reactive currents of inductive loads in a circuit. In addition, a pre-charging circuit 211 may be arranged at the output terminal of the AC/DC converter 206, and includes a switch and a safety device connected in parallel to the switch. The pre-charging circuit 211 functions to ensure that a pre-charging current does not exceed a threshold during pre-charging (when the switch is turned off), to avoid damaging components in the circuit. A plurality of inverters 207 may be arranged to supply power to different alternating current loads 209, respectively. Herein, the alternating current loads 209 are, for example, yaw motors and a control circuit.

An optional controller (not shown) is provided. The controller is configured to:
when it is detected that a voltage of the alternating current power grid 208 connected via the third switch 205 is lower than a voltage threshold (for example, during power outage), close the first switch 203 and/or the second switches 204 to connect the first sub power supply 201 and/or the second sub power supplies 202, such that in the case of closing the second switches 204, the DC/DC converters 213 operate forwards to discharge the second sub power supplies 202, where:
when expected output power (which is, for example, rated power of the load 209) of the standby power supply 200 is less than or equal to a power threshold, close the first switch 203 and open the second switches 204 to connect the first sub power supply 201; and
when the expected output power (which is, for example, peak power of the load 209) of the standby power supply 200 is greater than the power threshold, close the first switch 203 and the second switches 204 to connect the first sub power supply 201 and the second sub power supplies 202; and
when it is detected that the voltage of the alternating current power grid 208 connected via the third switch 205 is higher than the voltage threshold and an electric quantity of the second sub power supplies 202 is lower than an electric quantity threshold, close the second switches 204, such that the DC/DC converters 213 operate reversely to charge the second sub power supplies 202 from the alternating current power grid 208.

A workflow of the standby power supply 200 according to the present disclosure is described below.

Normal Power Grid Mode

When the alternating current power grid 208 supplies power normally, the third switch 205 is closed, such that the alternating current electrical energy of the alternating current power grid 208 is rectified by the rectifier 206 and inverted by the inverters 207 before supplying power to the alternating current loads 209. In view of this, the alternating current loads 209 may be isolated from the alternating current power grid 208 through the converters, thereby eliminating harmful electrical signals such as high-order harmonics and clutters generated by an upper transformer, and avoiding damage to the alternating current loads 209.

Charging Mode

When the alternating current power grid 208 supplies power normally and the first sub power supply 201 and/or the second sub power supplies 202 need to be charged (for example, an electric quantity of the sub power supplies is lower than an electric quantity threshold), the first switch 203 and/or the second switches 204 are closed, such that the DC/DC converters 213 operate reversely to charge the second sub power supplies 202 from the alternating current power grid 208. When charging is not required, the first switch 203 and/or the second switches 204 may be turned off. Such reverse charging allows the sub power supplies to be charged at any time and be in a usable state at any time.

Discharging Mode

Under the extreme condition, especially during the power failure of the alternating current power grid, i.e., when the alternating current power grid 208 cannot supply power, the first switch 203 and/or the second switches 204 are closed to connect the first sub power supply 201 and/or the second sub power supplies 202. When the required power of the load is less than or equal to the power threshold, only the first sub power supply 201 may be connected. When the required power of the load is greater than the power threshold, both the first sub power supply 201 and the second sub power supplies 202 may be connected.

A method for operating a standby power supply according to the present disclosure is described below using an offshore wind generator as an example.

Application of the anti-typhoon yaw standby power supply to the offshore wind generator:

When the offshore wind generator encounters a typhoon and the power grid loses power, it may be switched to the standby power supply according to the present disclosure to drive normal operation of a yaw system, thereby reducing the overall load, and greatly improving the reliability of the offshore wind generator. Turn-on and turn-off statuses of the standby power supply are as follows:

1) In a turn-on and operation status, the offshore wind generator is powered on at 400 Vac, and a frequency converter is normally closed and softly started to pre-charge a bus voltage Udc; after Udc is established, an inverter power supply is automatically turned on to supply power to a control system; after the control system is powered on and started, a direct current contactor is controlled to be closed, such that the process of establishing the bus voltage is completed; then, the yaw system follows a main control instruction to operate normally; and bidirectional DC/DC converters perform charging based on a battery voltage in a hysteresis control way, thereby avoiding repeatedly charging a battery.

2) In a status of switching to the standby power supply after the power grid loses power, the power is off at 400 Vac, and when Udc drops to a startup discharge threshold of the bidirectional DC/DC converters, the battery and the bidirectional DC/DC converters supply power to a bus; and a circuit breaker for the power grid is opened, a circuit breaker for an alternating current standby power supply is closed, the alternating current standby power supply is connected to the system, and the general frequency converter performs electrical energy conversion to supply power to the system. The switching and operation durations of two types of standby power supplies are controlled by a main control to complete the function of automatic switching between the power grid and the standby power supplies.

3) In a power-off status, the power is off at 400 Vac, the bidirectional DC/DC converters stop discharging, and a DC circuit switch is turned off, such that the system is powered off. It is noted that the standby power supply is still energized.

Figure 3:
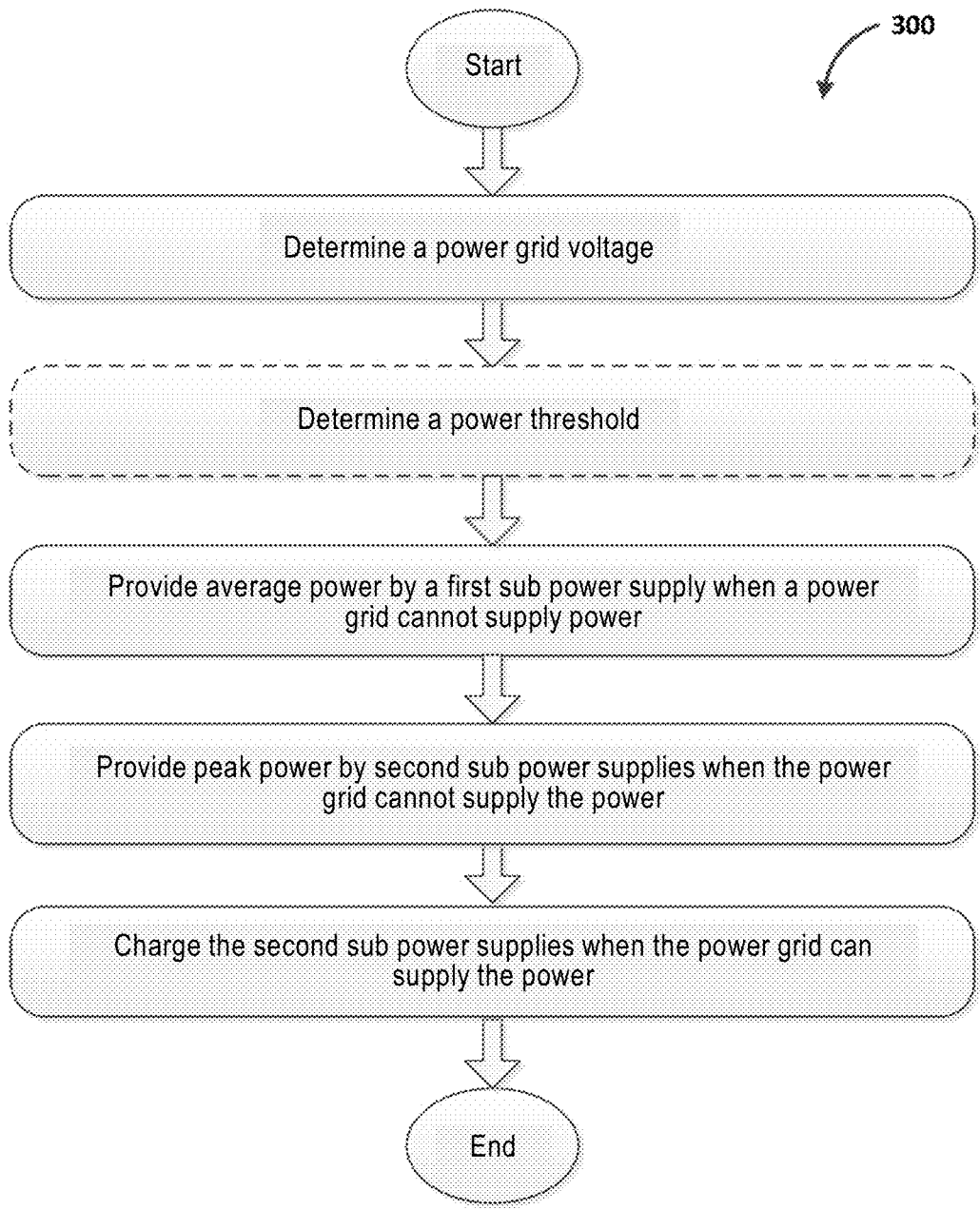
FIG. 3 shows a flowchart of a method for operating a standby power supply according to the present disclosure.

FIG. 3 shows a flowchart of a method 300 for operating a standby power supply according to the present disclosure, where a dashed line box shows an optional step.

In step 301, a power grid voltage of an alternating current power grid connected via a third switch is determined. For example, the power grid voltage may be measured by a voltage sensor and a voltmeter.

In optional step 302, a power threshold is determined. The power threshold $P_{threshold}$ may be determined according to the following formula:

$P_{threshold}=P_{average}*a+P_{peak}*(1-a)$, where $0 \le a \le 1$; $P_{average}$ is average power required for a power supply load, which may be subjected to statistics based on minute level load data; $P_{peak}$ is peak power of the power supply load, which may be subjected to statistics based on second level load data; and a is a proportional coefficient, by which the power threshold may be adjusted according to an actual system operation condition. For example, in an auxiliary power supply system of the wind generator, $P_{average}$ is 34 kW, $P_{peak}$ is 73 kW, a is 0.6, and $P_{threshold}$ may be set to 57 kW. Through research, the inventor has found that a time point at which a transition from the average power to the peak power occurs may be adjusted by adjusting a, that is, when the load power reaches a specific point between the average power and the peak power, the power of the standby power supply is adjusted to the peak power or above. The smaller the a is, the earlier the time point is, otherwise the later it is. Research has proved that when a ranges from 0.6 to 0.8, a better power transition may be implemented. In a preferred embodiment, a ratio between the power of the generator (such as the diesel generator) and the average power of the load of the power supply is greater than or equal to 1:1, and a ratio between the power of the generator and the peak power of the load of the power supply is less than or equal to 1:2 (i.e., less than or equal to 0.5). In this case, the power of the generator (the first sub power supply) is less than or equal to the power of the battery packs (the second sub power supplies). In view of this, a low-power generator may be configured instead of a high-power generator, thereby reducing the cost of the standby power supply.

In step 303, when the power grid voltage is lower than a voltage threshold and expected output power of the standby power supply is less than or equal to a power threshold, a first switch is closed and second switches are opened to connect a first sub power supply for supplying power.

In step 304, when the power grid voltage is lower than the voltage threshold and the expected output power of the standby power supply is greater than the power threshold, the first switch and the second switches are closed to connect the first sub power supply and the second sub power supplies for supplying power together, such that DC/DC converters operate forwards to discharge the second sub power supplies.

In step 305, when the power grid voltage is higher than the voltage threshold and an electric quantity of the second sub power supplies is lower than an electric quantity threshold, the second switches are closed, such that the DC/DC converters operate reversely to charge the second sub power supplies from the alternating current power grid.

While some embodiments of the present disclosure have been described in the present application document, those skilled in the art can understand that these embodiments are only shown as examples. Under the guidance of the present disclosure, those skilled in the art may think of many variant solutions, alternative solutions, and improved solutions without exceeding the scope of the present disclosure. The appended claims are intended to define the scope of the present disclosure and thus cover the methods and structures within the scope of these claims themselves and their equivalent transformations.

What is claimed is:

1. A standby power supply, comprising:
   a first sub power supply configured to provide alternating current electrical energy, wherein the first sub power supply is connected to an input terminal of an alternating current/direct current (AC/DC) converter;
   the AC/DC converter configured to convert the alternating current electrical energy into direct current electrical energy, wherein an output terminal of the AC/DC converter is connected to an output terminal of the standby power supply;
   a first switch, wherein the first sub power supply is connected to the input terminal of the AC/DC converter via the first switch;
   at least one second sub power supply configured to provide direct current electrical energy in parallel to an output of the AC/DC converter;
   at least one second switch, wherein the at least one second sub power supply is connected to the output terminal of the standby power supply via the at least one second switch respectively;
   a third switch operable to connect an alternating current power grid to the input terminal of the AC/DC converter; and
   a controller configured to determine a power threshold $P_{threshold}$ according to the following formula:

$$P_{threshold}=P_{average}*a+P_{peak}*(1-a),$$

wherein $P_{average}$ is average power required for a power supply load, which is statistically determined by the controller based on load data measured per minute from the standby power supply; $P_{peak}$ is peak power of the power supply load, which is statistically determined by the controller based on load data measured per second from the standby power supply; and a is a proportional coefficient, 0<a<1, by which the power threshold is adjusted;

wherein the controller is further configured to:

determine whether a voltage of the alternating current power grid connected via the third switch is lower than a voltage threshold;

in response to the voltage of the alternating current power grid is lower than the voltage threshold, determine whether expected output power of the standby power supply is less than or equal to $P_{threshold}$;

in response to the voltage of the alternating current power grid is lower than the voltage threshold and expected output power of the standby power supply is less than or equal to $P_{threshold}$, close the first switch and open the at least one second switch to supply power using the first sub power supply; and in response to the voltage of the alternating current power grid is lower than the voltage threshold and the expected output power of the standby power supply is greater than $P_{threshold}$, close the first switch and the at least one second switch to supply power using both the first sub power supply and the at least one second sub power supply.

2. The standby power supply according to claim 1, wherein 0.6≤a≤0.8.

3. The standby power supply according to claim 1, further comprising at least one DC/DC converter configured to convert direct current electrical energy at an output of the at least one second sub power supply into direct current electrical energy with different parameters, wherein an input terminal of the at least one DC/DC converter is connected to the at least one second sub power supply respectively, and an output terminal of the at least one DC/DC converter is connected to the output terminal of the standby power supply via the at least one second switch respectively.

4. The standby power supply according to claim 3, wherein the at least one DC/DC converter is a bidirectional DC/DC converter.

5. The standby power supply according to claim 4, wherein the controller is further configured to:

in response to the voltage of the alternating current power grid connected via the third switch is higher than the voltage threshold and an electric quantity of the at least one second sub power supply is lower than an electric quantity threshold, close the at least one second switch, such that the at least one DC/DC converter operates reversely to charge the at least one second sub power supply respectively from the alternating current power grid; and/or in response to the voltage of the alternating current power grid connected via the third switch is lower than the voltage threshold and the electric quantity of the at least one second sub power supply is lower than the electric quantity threshold, close the first switch and the at least one second switch, such that the at least one DC/DC converter operates reversely to charge the at least one second sub power supply respectively from the first sub power supply.

6. The standby power supply according to claim 1, wherein the first sub power supply comprises one or more of the following:

a generator; and a combination of a battery pack and a direct current to alternating current converter; and the at least one second sub power supply comprises one or more of the following:

a battery pack and a supercapacitor; and a combination of a generator and an alternating current to direct current converter.

7. The standby power supply according to claim 1, wherein the first switch, the at least one second switch and/or the third switch comprises one of the following: a power switch, a circuit breaker, a contactor, and a relay.

8. The standby power supply according to claim 1, further comprising inverters configured to convert direct current electrical energy at the output of the AC/DC converter into respective alternating current electrical energy outputs, wherein input terminals of each of the inverters are connected to the output terminal of the standby power supply, and an output terminal of each of the inverters is connected to a respective load.

9. A wind generator having the standby power supply according to claim 1, wherein a load connected to the output terminal of the standby power supply comprises one or more of the following: a yaw bearing, a pitch bearing, and a control circuit.

10. A new energy device having the standby power supply according to claim 1.

11. A method for operating a standby power supply, comprising:

at a controller coupled to the standby power supply, the standby power supply comprising: a first sub power supply configured to provide alternating current electrical energy, wherein the first sub power supply is connected to an input terminal of an AC/DC converter, the AC/DC converter configured to convert the alternating current electrical energy into direct current electrical energy, wherein an output terminal of the AC/DC converter is connected to an output terminal of the standby power supply; a first switch, wherein the first sub power supply is connected to the input terminal of the AC/DC converter via the first switch; at least one second sub power supply configured to provide direct current electrical energy in parallel to an output of the AC/DC converter; at least one second switch, wherein the at least one second sub power supply is connected to the output terminal of the standby power supply via the at least one second switch respectively; and a third switch operable to connect an alternating current power grid to the input terminal of the AC/DC converter;

determining by the controller a voltage of the alternating current power grid;

determining by the controller a power threshold $P_{threshold}$ according to the following formula:

$$P_{threshold} = P_{average} * a + P_{peak} * (1-a),$$

wherein $P_{average}$ is average power required for a power supply load, which is statistically determined by the controller based on load data measured per minute from the standby power supply; $P_{peak}$ is peak power of the power supply load, which is statistically determined by the controller based on load data measured per second from the standby power supply; and a is a proportional coefficient, 0<a<1, by which the power threshold is adjusted;

determining whether the voltage of the alternating current power grid connected via the third switch is lower than a voltage threshold;

in response to the voltage of the alternating current power grid is lower than the voltage threshold, determining whether expected output power of the standby power supply is less than or equal to $P_{threshold}$;

in response to the voltage of the alternating current power grid is lower than the voltage threshold and expected output power of the standby power supply is less than or equal to $P_{threshold}$, closing the first switch and open the at least one second switch to supply power using the first sub power supply; and in response to the voltage of the alternating current power grid is lower than the voltage threshold and the expected output power of the standby power supply is greater than $P_{threshold}$, closing the first switch and the at least one second switch to supply power using both the first sub power supply and the at least one second sub power supply.

12. The method according to claim 11, wherein the standby power supply further comprises at least one bidirectional DC/DC converter configured to convert direct current electrical energy at an output of the at least one second sub power supply into direct current electrical energy with different parameters, and wherein an input terminal of the at least one bidirectional DC/DC converter is connected to the at least one second sub power supply respectively, and an output terminal of the at least one bidirectional DC/DC converter is connected to the output terminal of the standby power supply via the at least one second switch respectively, the method further comprising:

in response to the voltage of the alternating current power grid is higher than the voltage threshold and an electric quantity of the at least one second sub power supply is lower than an electric quantity threshold, the controller closing the at least one second switch, such that the at least one bidirectional DC/DC converter operates reversely to charge the at least one second sub power supply respectively from the alternating current power grid; and in response to the voltage of the alternating current power grid is lower than the voltage threshold and the electric quantity of the at least one second sub power supply is lower than the electric quantity threshold, the controller closing the first switch and the at least one second switch, such that the at least one bidirectional DC/DC converter operates reversely to charge the at least one second sub power supply respectively from the first sub power supply.

13. The method of claim 11, wherein $0.6 \leq a \leq 0.8$.

* * * * *